United States Patent [11] 3,628,677

[72] Inventor Frank M. Cislaw
27317 Novi Road, Novi, Mich. 48050
[21] Appl. No. 821,665
[22] Filed May 5, 1969
[45] Patented Dec. 21, 1971

[54] CAR TOP CARRIER
1 Claim, 9 Drawing Figs.
[52] U.S. Cl. .................................................. 214/450
[51] Int. Cl. ............................................... B60p 3/10
[50] Field of Search .......................................... 214/450;
224/42.1, 42.1 E, 42.1 F, 42.1 G, 42.1 LM

[56] References Cited
UNITED STATES PATENTS
3,044,643 7/1962 Shaw .......................... 214/450
3,363,788 1/1968 Grosclaude et al. .......... 214/450
2,561,199 7/1951 Harder ......................... 214/450
2,772,799 12/1956 Bridinger ..................... 214/450
2,895,628 7/1959 Gebhart ....................... 214/450

Primary Examiner—Gerald M. Forlenza
Attorney—Farley, Forster and Farley

ABSTRACT: Means for providing a vertical support on and at one end of a car, a carrier member positionable on the support between a lower and rearwardly disposed position and an upper and forwardly disposed position, and means capable of attachment to the roof of the car and for cooperation with the carrier member in its elevated position to support a boat or other member therebetween.

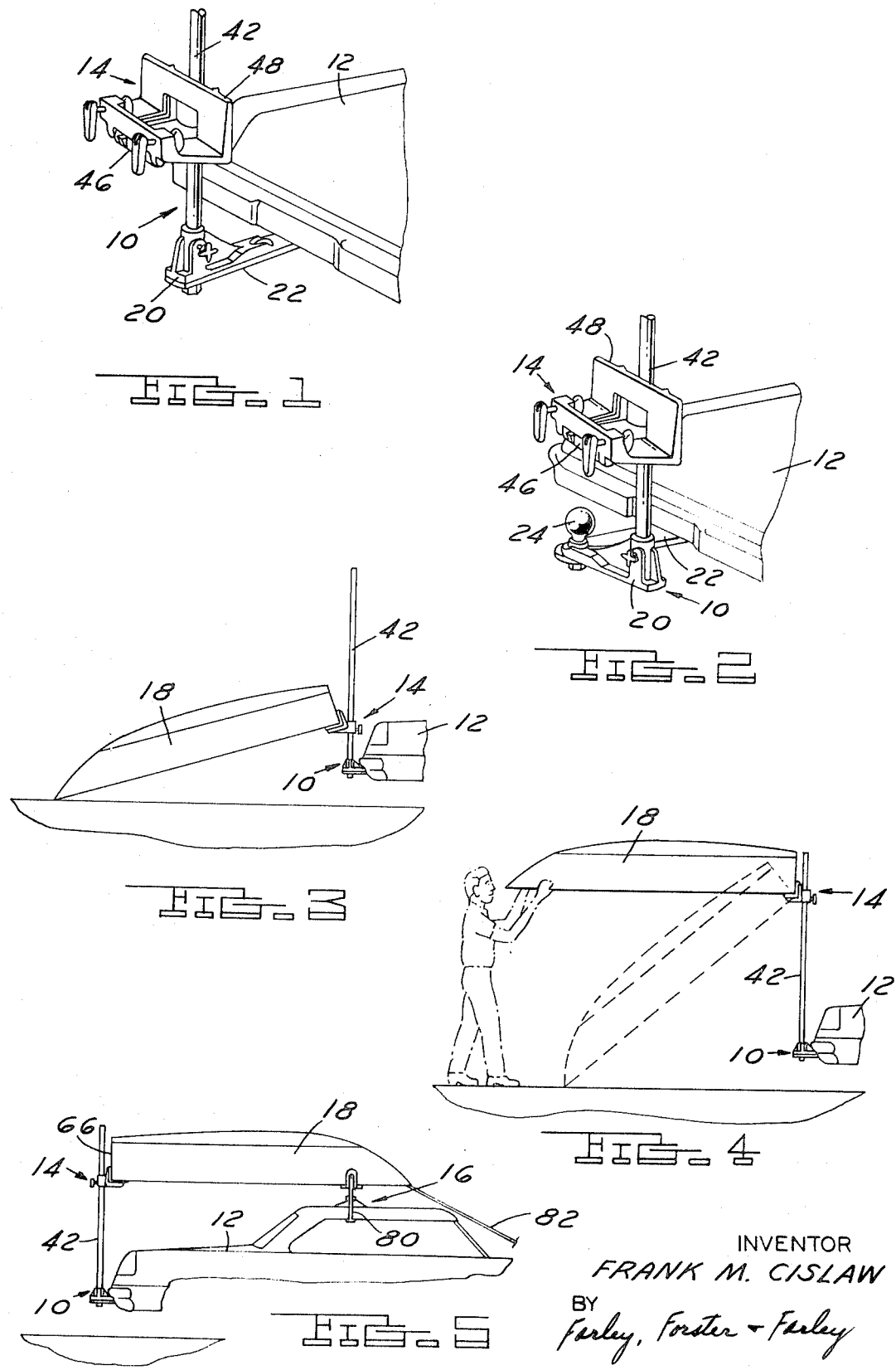

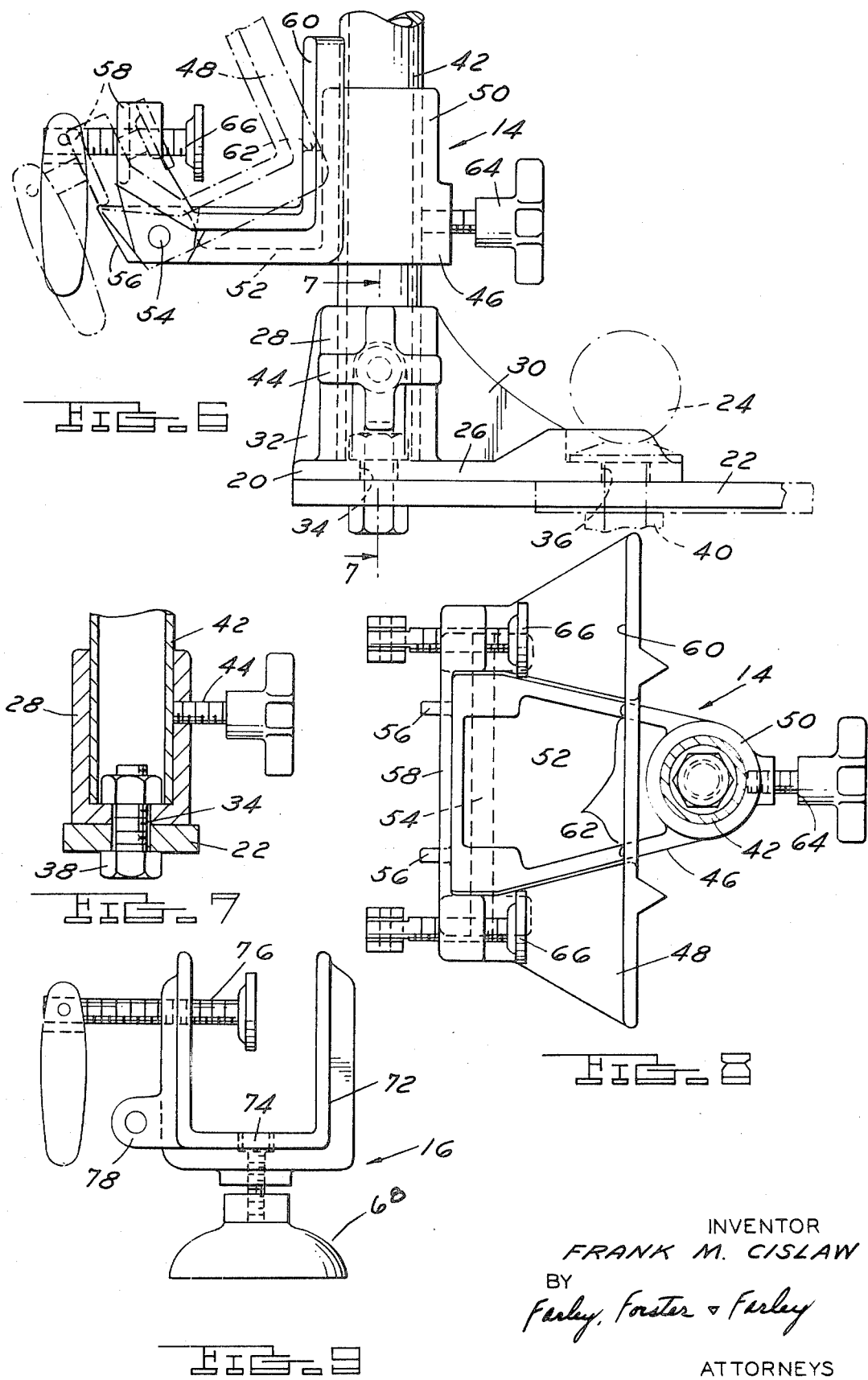

CAR TOP CARRIER

BACKGROUND OF THE INVENTION

Car top boat carriers are commonly known and used for transporting small boats from one place to another and for avoiding the encumbrances of a trailer in travelling on the highways and through backwooded areas.

The simplest type of car top boat carrier includes a pair of cross bars on suction cups that are mounted on a car top and are spaced apart to receive a boat upside down, thereacross and between. However, this type of carrier is adaptable for use only with cars which have a reasonable long and relatively flat roof line, such as sedans and station wagons, where the cross supports can be spaced reasonably far apart. They are not recommended for cars with small roof areas or fast-back models with rearwardly sloping roof lines where the supports must be placed closer together or will not be in a relatively common horizontal plane.

Another problem with this simple-type car top carrier is that it takes at least two strong men to lift the boat to car top height and to be able to maneuver it around a car and set it on the carrier rack. It cannot be used by one man alone or even a man and a woman, or small child, because of the weight of the boat and height to which it must be raised to properly position it over the carrier rack or to remove it therefrom.

Various means of hoisting a boat to car top height or pulling it up guide rails extending down the back of a car have been considered to enable one person to load and unload a boat from a car top rack. However, the added expense of such devices, and the more permanent installation required on a car, have discouraged their adoption and use by other than the most avid and regular fisherman or boat enthusiast.

When is needed is a car top rack that may be used on any type or style of car, which is easy to install and remove when not needed, that is relatively inexpensive to manufacture so that it can sell at a reasonable price, and which may be used by one person with relative ease and simplicity.

SUMMARY OF THE INVENTION

The present invention relates to car top carriers in general and more particularly to an extremely simple type of lift and carrier which may be used by one person alone without other help or assistance. The car top carrier of this invention includes a bracket for a vertical post or stanchion at the rear of a car and of sufficient height to extend above the roof line, a carrier member journaled on the post and which may be turned about the post and raised or lowered on it, and a pair of rooftop supports with suction cups that are mounted on the car top itself.

To use the carrier, a boat is turned bottom-side up behind the car and its transom is lifted and placed in the carrier member on the vertical post. The transom of the boat and the carrier member are lifted together to car top height, with the bow of the boat still on the ground, and the carrier member is fixed in its elevated position. The bow of the boat is then picked up and swung around over the front of the car, while its transom is supported in the carrier member and the carrier member turns on the post. The bow of the boat is set down on the two rooftop supports.

A more detailed description of a working embodiment of the invention and a discussion of its uses and advantages is given in the specification which follows a brief description of the accompanying drawings.

DESCRIPTION OF THE DRAWINGS

FIG. 1 is a perspective view of the lift device provided on a trailer hitch at the back of a car.

FIG. 2 is a perspective view similar to FIG. 1 with the lift device mounted on one side of the trailer hitch.

FIGS. 3-5 show, in succession, how the lift device is used to lift and carry a small boat on a car.

FIG. 6 is an enlarged side elevational view of the lift device provided on and disposed down near a trailer hitch on the back of a car.

FIG. 7 is a cross-sectional view taken in the plane of line 7—7 in FIG. 6 and showing the holder for the upright vertical support.

FIG. 8 is a top plan view of the carrier member on the lift device as seen in a plane through the upright support extending thereover.

FIG. 9 is a side elevational view of one of the two rooftop supports used with the lift to provide the roof top carrier.

DETAILED DESCRIPTION OF THE INVENTION

The car top boat lift and carrier shown in the accompanying drawings includes a boat lift 10 that is mounted on the back end of a car 12 and has a carrier and lift member 14 provided thereon which can be elevated to car top height and used with a pair of roof top supports 16, as best shown in FIG. 5, to serve as a rooftop carrier for a boat 18.

The lift device 10 includes a holder member 20 which may be supported on and fastened to a trailer hitch extension 22 on the back of a car, as shown in FIG. 1, or which may be fastened with the ball adapter 24 of a trailer hitch to it and disposed off to one side, as shown in FIG. 2, so that the trailer hitch is still usable for its intended purpose. Referring to FIG. 6 it will be appreciated that the holder 20 is a casting having a base plate 26, an upright collar or cup member 28 at one end, strengthening webs 30 and 32, and holes 34 and 36 through opposite ends of the base plate for attaching it to the trailer hitch extension 22, as by the use of the nut-and-bolt fastener means 38 at one end, as in FIG. 7, or the ball adapter 24 and locknut 40 at the other end, as seen in FIG. 2 and in phantom outline in FIG. 6.

A length of standard 1 inch galvanized water pipe, or the like, is used to provide a vertical post or stanchion 42, with its lowermost end received in the cup or collar member 28 and retained by a hand knob operated set screw 44. Its other end extends to a height relatively over the roof line of the car 12, as best shown in FIG. 5.

The carrier and lift member 14 is shown best in FIGS. 6 and 8 to include two castings 46 and 48 which are interfitted and pivotally engaged together. The one casting 46 is formed to include a sleeve 50 that fits the post 42 and a part 52 extends out normal to the sleeve from its lower end. The other casting 48 is like an upwardly open channel member with its midsection cut out to straddle the part 52 and it is pivotally connected to the latter at its outermost lower corners, as by the cross pin 54, so that it may be tilted in a downwardly inclined direction, relative to the vertical post, as best shown in phantom outline in FIG. 6.

A pair of stops 56 on the end of the casting 46 are disposed for engagement by the outer sidewall 58 of the other casting 48, to limit outward tilting movement, and movement in the other direction is limited by interference engagement of the inner sidewall 60 of the casting 48 with shoulder walls 62 formed with and extended out from the sleeve 50 on the carrier part 46.

A hand knob operated set screw 64 is used to fix the carrier at any selected height on the post and screw clamp member 66 are provided on the pivotal member 48 for holding the transom of the boat 18 engaged therein as received on the carrier part; having been manually placed there as will later be described.

In FIG. 9 one of the roof top supports 16 is shown. It includes a suction cup member 68 fastened to an upwardly open channellike fitting 72 by a fastener 74 which also serves as an adjustment means, as later described. The channel or U-shaped fitting 72 includes a screw clamp 76, by means of which it may receive and hold the side rail of an overturned boat therewithin, as mounted on a car top, and a fitting 78 is provided on one side by means of which it may be held by a strap 80 to the car top, as shown in FIG. 5.

From the foregoing, it will be appreciated that the boat lift and carrier embodiment of this invention includes a holder member 20, a carrier 14 of two preassembled parts, two rooftop supports 16, and a retaining strap 80. Whether or not the vertical post 42 is offered with the other parts is optional since a standard length of water pipe may be used and could be purchased separately.

Referring now to FIGS. 3-5, after the holder member 20 is attached to a trailer hitch extension 22, or like means, preferably attached to the vehicle frame of car 12 and extending out behind the car centrally thereof, the vertical support member 42 is placed in the holder to stand thereover. The carrier 14 may be disposed on the post 42 before or after this is done.

The boat 18 is turned bottom-side up behind the car 12 with its bow extending in the opposite direction, relative to the direction the car is facing, and so that its transom is next to lift means 10 on the back end of the car. After the carrier 14 on post 42 is turned to face rearwardly, the stern of the boat is lifted manually and its transom is placed in the channel-shaped part 48 which is free to tilt as necessary to accommodate the boat, as shown in FIG. 3.

The clamp screws 66 are turned down to hold the carrier and lift member 14 engaged to the stern of the boat and the back end of the boat is then raised to the dotted line position shown in FIG. 4, with its bow still on the ground. The carrier and lift member 14, being clamped to the stern of the boat, is lifted with the back end of the boat and once at the selected height, which will be relatively above the roof line of the car 12, the hand knob set screw 64 is turned down to lock it in its elevated position.

The front or bow end of the boat is then lifted, as shown in FIG. 4, and the boat is swung around into position over the car. The carrier and lift member 14 is fastened to the post 42 and causes the post to turn in the holder 20 about its own axis. If the car top boat lift and carrier has been used before the rooftop supports 16 will already be in position on the car top and the bow of the boat can be lowered down onto them. If not, it is advisable to attach the supports 16 to the sides of the boat before the bow is lifted up and swung around. Then they can be positioned on the car top with the boat and later fastened down with strap 80.

It will be noted that the rooftop bracket part 72 can swivel relative to the suction cup, so that it can be used anywhere along the converging sides that form the bow of the boat, and they may also be raised or lowered, by being screwed up or down. The preferred amount of separation between the suction cup 68 and the U-shaped saddle bracket 72 is about that shown in FIG. 9, so there isn't too much strain on the fastener 74 and it merely serves as a pivot pin connector.

As will be appreciated, after the car top lift and carrier has been used a few times the exact height to lift the carrier and lift member 14 on the post, before fastening it to the post, where to locate the rooftop supports on the car top, and how low or high these supports are to be adjusted, so that the boat rides level, will be known and no last-minute adjustments will be necessary while holding the boat aloft.

In lifting the stern and the bow of the boat, and in swinging the boat around over the top of the car, it will be appreciated that the use of the cross pin 54 to pivotally connect the carrier and lift parts together provides a relatively stable support and one which prevents the boat from tipping from one side to the other. Although it is expected that a person will be careful in raising the stern of the boat, and in lifting the bow, this is quite important and most beneficial when it comes to positioning the bow of the boat over the car top since it must be done from one side or the other of the car.

The two spaced rooftop supports 16 and the carrier and lift member 14 on the support post 42 provide good three-point support for the boat and insure reasonable stability in traveling. However, as an added safety measure, a bowline 82 to the front of the car is a good idea and is recommended.

It should be obvious, without discussion, that the procedure for placing a boat on a car is followed in reverse order to get it down.

It is also assumed that the use of the lift and carrier for other than handling a boat can be appreciated and that no discussion in this regard is necessary.

Only one person, without any other aid or assistance, can easily and quickly use the lift and carrier of this invention. The lift and rooftop supports can be mounted on a car in a matter of a few minutes and as easily taken down and stored in the trunk of the car. The boat is carried back over the rear trunk lid and roof of the car so that there is no overhead obstruction to the driver's view and offers far less wind resistance in travelling than is otherwise a consequence of the necessary forwardly disposed overhang with most car top carrier racks.

I claim:

1. A car top boat lift and carrier, comprising: a trailer hitch for attachment on and at one end of an automobile vehicle including a fixed bearing socket and a vertical post member received and rotatably supported in said socket to extend above the roof line of the vehicle slide means vertically adjustable on said post member carrier member on said slide means for swinging on a horizontal axis for receiving one end of a boat in engagement therewith and for being lifted with said boat end to raise said adjustable means to an elevated position on said post member, hand turntable knob and screw means on said slide means for clamping said slide on said post member at said elevated position and adapted to rotate with said post member and said carrier member when the boat is moved from a rearwardly to a forwardly disposed position over said vehicle, said carrier member having opposed clamping surfaces for clamping said one end of said boat, said clamping surfaces being located between said horizontal pivotal axis of the carrier member and the post and supporting members on the roof of said vehicle near opposite sides thereof for receiving and supporting the front end of the boat and carrying the weight thereof in combination with said carrier member on said post member.

* * * * *